United States Patent
Wynn

(12) 
(10) Patent No.: US 6,629,137 B1
(45) Date of Patent: Sep. 30, 2003

(54) NETWORK INTERFACE DEVICES METHODS SYSTEM AND COMPUTER PROGRAM PRODUCTS FOR CONNECTING NETWORKS USING DIFFERENT ADDRESS DOMAINS THROUGH ADDRESS TRANSLATION

(75) Inventor: Stephen Robert Wynn, Lynchburg, VA (US)

(73) Assignee: Telefonaktiebolaget L.M. Ericsson (SE)

( * ) Notice: Subject to any disclaimer, the term of this patent is extended or adjusted under 35 U.S.C. 154(b) by 0 days.

(21) Appl. No.: 09/558,175

(22) Filed: Apr. 26, 2000

(51) Int. Cl.[7] ............................................... G06F 15/16
(52) U.S. Cl. ..................................................... 709/223
(58) Field of Search ................................ 709/223, 225, 709/220, 230

(56) References Cited

U.S. PATENT DOCUMENTS

| | | | | |
|---|---|---|---|---|
| 6,353,614 B1 | * | 3/2002 | Borella et al. ............... | 370/389 |
| 6,360,265 B1 | * | 3/2002 | Falck et al. .................. | 709/227 |
| 6,393,488 B1 | * | 5/2002 | Araujo ........................ | 709/245 |
| 6,487,605 B1 | * | 11/2002 | Leung ......................... | 709/245 |
| 6,493,765 B1 | * | 12/2002 | Cunningham et al. ....... | 709/245 |
| 6,567,405 B1 | * | 5/2003 | Borella et al. ............... | 370/389 |

* cited by examiner

*Primary Examiner*—David Y Eng
(74) *Attorney, Agent, or Firm*—Myers Bigel Sibley & Sajovec, P.A.

(57) ABSTRACT

A local network that includes one or more hosts and has a local address domain associated therewith may communicate with an external network having an external address domain associated therewith through a network interface device. The local addresses of the hosts on the local network may be learned and then external addresses may be obtained for each of the learned hosts. Information may be sent from the external network to a host on the local network using the external address associated with the host as a destination address. The external address used as the destination address for the host may then be translated into the local address for the host. Similarly, information may be sent from a host on the local network to the external network using the local address as the source address. The local address used as the source address by the host may then be translated into the corresponding network address that has been obtained for that host. The network interface device may serve as a proxy by translating local addresses into external addresses and vice versa for communication between hosts on the local network and entities in the external network. A unique, one-to-one correspondence may be established between the local addresses and the external addresses associated with the hosts. Thus, an external network administrator may monitor the number of hosts that are in service on the local network through the external addresses that are assigned to the hosts. This may allow the external network administrator to bill for their service based on the number of hosts on a customer's local network.

40 Claims, 4 Drawing Sheets

NETWORK INTERFACE DEVICES METHODS SYSTEM AND COMPUTER PROGRAM PRODUCTS FOR CONNECTING NETWORKS USING DIFFERENT ADDRESS DOMAINS THROUGH ADDRESS TRANSLATION

BACKGROUND OF THE INVENTION

The present invention relates generally to the field of communication networks, and, more particularly, to communication between networks that use different address domains.

One aspect of the evolution of cable television has been the development of hybrid fiber coax (HFC) networks. Instead of being based entirely on coaxial cable, HFC networks generally include optical fiber cable between the head end and local serving nodes. Each local serving node typically includes a media translator to convert the optical signal into an electrical signal, which is then carried to customers via traditional coaxial cable spans. Cable television companies, or multiple system operators (MSOs) as they are often called, have upgraded many of their existing coaxial cable networks to HFC to take advantage of reduced maintenance costs and improved bandwidth of the optical fiber cable.

With the growth of the Internet, however, MSOs may seek to leverage their investment in these HFC networks to provide more than just cable television programming. The ubiquitous nature of the HFC based cable television network is advantageous in that high-speed data service may be provided to a large segment of the population without the need to install new network infrastructure. As part of providing customers with data-over-cable service, a cable modem is generally used to modulate and demodulate signals passed between the cable television network and the customer premises equipment (CPE) or hosts.

Traditionally, when a customer purchases a cable modem to access an MSOs cable network, a protocol known as dynamic host configuration protocol (DHCP) is run on the cable modem and the hosts (i.e., CPE) at the customer's home or business to obtain Internet Protocol (IP) addresses that are compatible with the MSOs cable network. Unfortunately, a customer may already have a local network environment in place, such as an Ethernet network, which may or may not be compatible with the address domain used in the MSOs cable network. Moreover, a customer may already have additional external network addresses defined for their hosts to access the Internet or another local or wide area network. As a result, a customer may need to reconfigure their local network by eliminating existing external network addresses and/or by adding the new addresses for the MSOs cable network.

One approach to connecting a local network to an external network without the need to reconfigure the local network is known as network address translation (NAT). Through NAT, a local network may be isolated from an external network by defining a single external network address, which is then used by all entities in the external network for communicating with a host located on the local network. In general, NAT works by storing most or all of the local network addresses in a table, which a gateway or firewall then uses to map to the single external network address. From a point of view outside of the local network, all of the hosts on the local network have the same address (i.e., the external network address defined for NAT). Information destined for the respective hosts is, therefore, routed by the gateway or firewall based on the media access control (MAC) address, local network port number, or other host identification information.

While NAT may allow the local network address configuration to remain intact while providing access to an external network, NAT may also shield knowledge regarding the configuration of the hosts on the local network from an operator or administrator residing on the external network. For example, if the MSO wishes to charge for their service based on the number of hosts on a customer's local network, then the MSO could not rely on the number of external network addresses assigned to the local network to determine the number of hosts because NAT uses only one external network address to service the customer's entire local network. As a result, the MSO may need to visit the customer periodically to examine the customer's local network configuration to generate billing information.

Consequently, there exists a need for improvements in connecting a local network to an external network that uses a different address domain than the local network.

SUMMARY OF THE INVENTION

According to embodiments of the present invention, a local network that includes one or more hosts and has a local address domain associated therewith may communicate with an external network having an external address domain associated therewith through a network interface device. The local addresses of the hosts on the local network may be learned and then external addresses may be obtained for each of the learned hosts. Information may be sent from the external network to a host on the local network using the external address associated with the host as a destination address. The external address used as the destination address for the host may then be translated into the local address for the host. Similarly, information may be sent from a host on the local network to the external network using the local address as the source address. The local address used as the source address by the host may then be translated into the corresponding network address that has been obtained for that host.

The present invention may serve as a proxy by translating local addresses into external addresses and vice versa for communication between hosts on the local network and entities in the external network. Unlike systems that use Network Address Translation (NAT) in which multiple local addresses may be mapped to a single external address, the present invention may provide a unique, one-to-one correspondence between the local addresses and the external addresses associated with the hosts. Advantageously, an administrator or operator, such as a multiple service operator (MSO), that resides in the external network may monitor the number of hosts that are in service on the local network through the external addresses that are assigned to the hosts. This may allow the external network administrator to bill for their service based on the number of hosts on a customer's local network without the need to periodically send a representative into the field to inspect the customer's local network.

In addition, by providing address translation at the interface of the local network with the external network, the local network need not be reconfigured through the elimination of existing local addresses and/or the addition of new external network addresses into the local network. Thus, the present invention may allow a local network to communicate with an external network while isolating the local network from the details of the external network configuration (i.e., address domain). This aspect of the present invention may facilitate "plug-and-play" access of the external network from the point of view of hosts on the local network. Accordingly, the need for site visits by technicians associated with the external network operator (e.g., the MSO) to establish external network service when a new host is added to the local network or for initially establishing external network service to the local network may be reduced or even eliminated.

In accordance with various embodiments of the present invention, the local addresses of the hosts on the local network may be learned in alternative ways. For example, a message may be asynchronously received from a host that contains that host's local address. Alternatively, a request that the hosts respond with their respective local addresses may be broadcast on the local network. A message may then be received from each of the responding hosts containing that host's local address. Yet another approach to learning the local addresses of the hosts on the local network may involve storing a list of pre-defined local addresses for the hosts on a computer-readable storage medium. The local addresses may then be read from this stored, pre-defined list.

In accordance with another embodiment of the present invention, the external addresses for the learned hosts may be obtained by sending an external address request to a dynamic host configuration protocol (DHCP) server for each learned host and then receiving an external address from the DHCP server in response to each request. If the external address is an Internet Protocol (IP) address, then, preferably, the external address request contains the media access control (MAC) address of the network interface device and an IP address of all zeros.

Thus, in summary, the present invention may provide a local network with plug-and-play access of an external network while allowing administrators of the external network to have easier access to information with respect to the configuration of the local network, which may facilitate billing for services based on the number of hosts on the local network.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
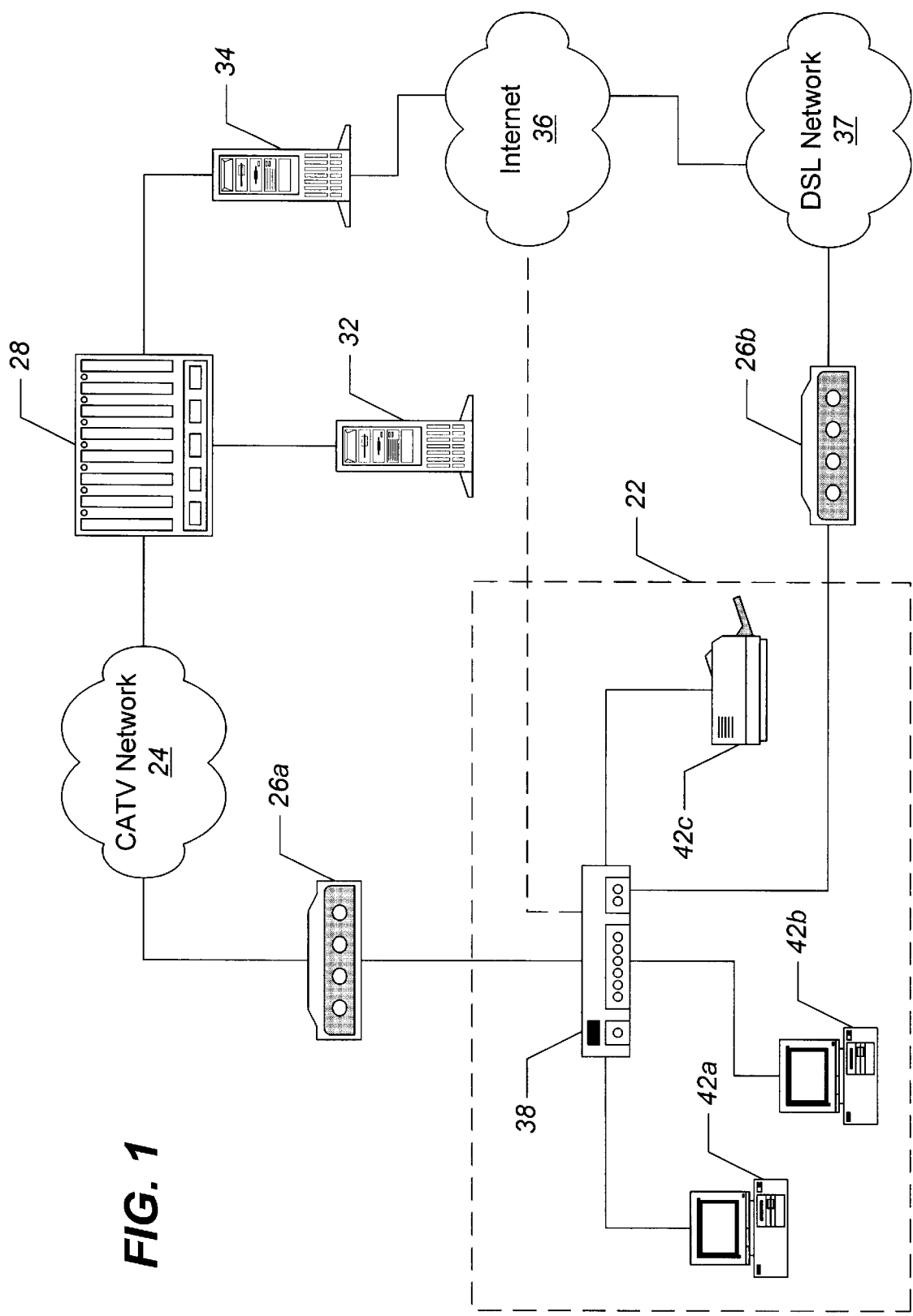
FIG. 1 illustrates an exemplary communication system network architecture that includes multiple networks using different address domains.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

For purposes of illustration and in no way limited thereto, the present invention is described herein in the context of connecting a local network to a cable television network through a network interface device, such as a cable modem. It will be understood that the concepts and principles of the present invention may generally be applied to connect a local network to an external network, which uses a different address domain than the local network, through a network interface device.

The present invention may be embodied as network interface devices, methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Referring now to FIG. 1, an exemplary communication system network architecture in accordance with the present invention includes a local network 22, which is connected to an external, centralized access television (CATV) or cable network 24 through a cable network interface device 26a. The cable network interface device 26a may be embodied, for example, as a cable modem. The cable network interface device 26a is connected through the CATV network 24 to a head end or cable modem termination system (CMTS) 28.

For purposes of illustration, a single cable network interface device 26a is shown connected to the CATV network 24. It is nevertheless understood that a typical CATV network 24 may terminate many cable network interface devices 26a. The CATV network 24 is typically an HFC network as discussed hereinabove. Moreover, in a conventional multiple service operator (MSO) network, the CMTS 28 may be connected to several CATV networks 24. Preferably, the cable network interface device 26a is compatible with the Data Over Cable System Interface Specification (DOCSIS).

The CMTS 28 is connected to a dynamic host configuration protocol (DHCP) server 32, which may be accessed to acquire an Internet Protocol (IP) address for networks and subnetworks that are under the control of the CMTS 28. The CMTS 28 is also connected to an Internet server 34, which acts as a gateway/firewall between the CMTS 28 and the Internet 36.

The local network 22 may also be connected to a digital subscriber line (DSL) network 37 through a DSL network interface device 26b. The DSL network interface device 26b may be implemented, for example, as a DSL modem. In addition, the DSL network 37 may be connected to the Internet 36. As a result, hosts on the local network 22 may have multiple options for establishing an Internet 36 connection. That is, hosts on the local network 22 may establish Internet connections over the CATV network 24 and/or the DSL network 37.

As shown in FIG. 1, the local network 22 includes a local network hub 38 and a plurality of hosts 42a, 42b, and 42c, which may be connected in a star or hub-and-spoke configuration. The present invention does not rely on a particular configuration, standard, or protocol for the local network 22. Accordingly, the local network 22 may be embodied as a conventional network, such as, but not limited to, an Ethernet network, a Token Ring network, and the like. The hosts 42a, 42b, and 42c shown comprising the local network 22 include two desktop computers 42a and 42b and a printer 42c. The number and type of hosts comprising the local network 22, however, is not limited to these three examples. In general, the term "host" refers to any attached device on the local network 22, which may include, but is not limited to, computers, workstations, printers, mainframes, routers, and other addressable electronic equipment.

As discussed hereinabove, the local address domain of the local network 22 may not be compatible with the external address domains used in the CATV network 24 and/or the DSL network 37. Moreover, additional external network addresses may be defined for the hosts 42a, 42b, and 42c to facilitate communication between the hosts 42a, 42b, and 42c and the Internet (as illustrated by the dotted line between the local network hub 38 and the Internet 36) or another local or wide area network. In accordance with the present invention, however, the network interface devices 26a,b may provide address translation at the respective interfaces of the local network 22 with the CATV and DSL networks 24, 27 so that the local network 22 need not be reconfigured through the elimination of existing local addresses and/or the addition of new external network addresses to communicate with the CATV and DSL networks 24, 37.

Figure 2:
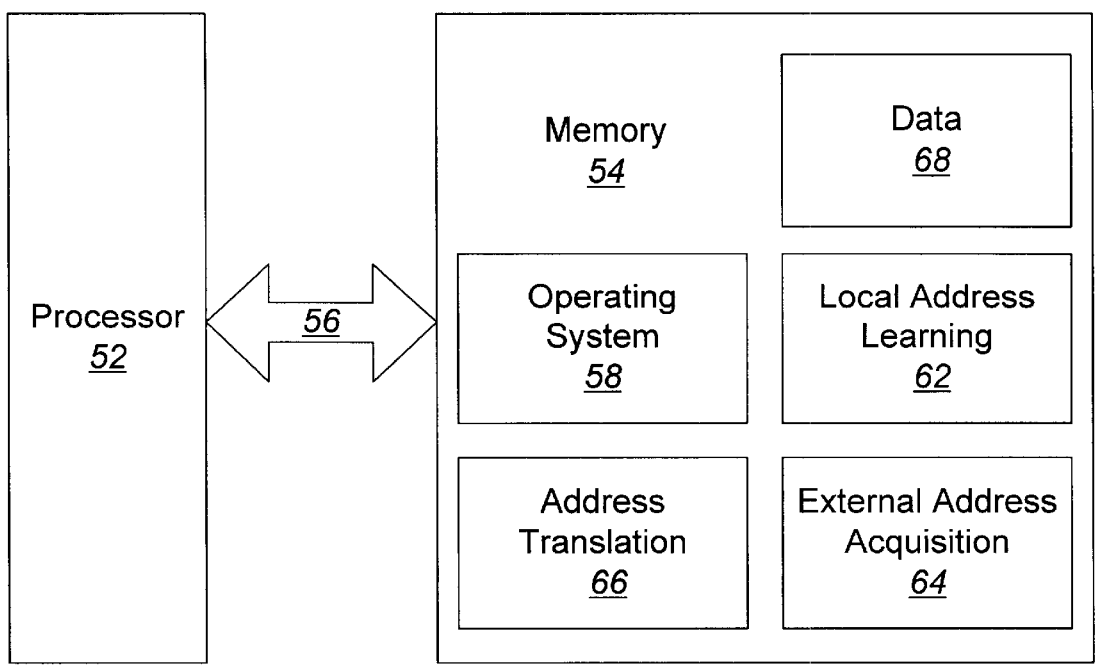
FIG. 2 is a block diagram that illustrates a processor and memory that may be used in embodiments of a network interface device shown in FIG. 1 in accordance with the present invention.

FIG. 2 illustrates a processor 52 and a memory 54, which may be used in the network interface devices 26a,b of FIG. 1. The processor 52 communicates with the memory 54 via an address/data bus 56. The processor 52 may be, for example, a commercially available or custom microprocessor suitable for an embedded application. The memory 54 is representative of the overall hierarchy of memory devices containing the software and data used to implement the functionality of the respective network interface devices 26a,b. The memory 54 may include, but is not limited to, the following types of devices: cache, ROM, PROM, EPROM, EEPROM, flash, SRAM, and DRAM.

As shown in FIG. 2, the memory 54 may hold five major categories of software and data used in the network interface devices 26a,b: the operating system 58; the local address learning program module 62; the external address acquisition program module 64; the address translation program module 66; and the data module 68. The operating system 58 is preferably designed for real-time networking and routing applications. The local address learning module 62 may be used to learn the local addresses of the hosts 42a, 42b, and 42c on the local network 22 both at initialization and when new hosts are added to the local network 22. The external address acquisition module 64 may be used to obtain an external address (e.g., an address compatible with the CATV network 24 or the DSL network 37) for each of the learned hosts on the local network 22. The address translation module 66 may be used as a proxy to translate local addresses into external addresses and vice versa for communication between hosts on the local network 22 and entities in the external, CATV network 24. The data module 68 may be used as a storage repository for the learned local addresses and acquired external addresses for the hosts on the local network 22. The data module 68 may also be used for storage of additional static and/or dynamic data used by the operating system module 58, the local address learning module 62, the external address acquisition module 64, and the address translation module 66.

Computer program code for carrying out operations of the respective program modules associated with the network interface devices 26a,b may be written in a high-level programming language, such as C or C++, for development convenience. Nevertheless, some modules or routines may be written in assembly language or even micro-code to enhance performance and/or memory usage. It will be further appreciated that the functionality of the local address learning module 62, the external address acquisition module 64, and the address translation module 66 may also be implemented using discrete hardware components, a single application specific integrated circuit (ASIC), or a programmed digital signal processor or microcontroller. In particular, it may be desirable to implement the address translation module 66 partly or entirely in hardware for increased speed in translating between external addresses and local addresses in real-time.

The present invention is described hereinafter with reference to flowchart and/or block diagram illustrations of network interface devices, methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
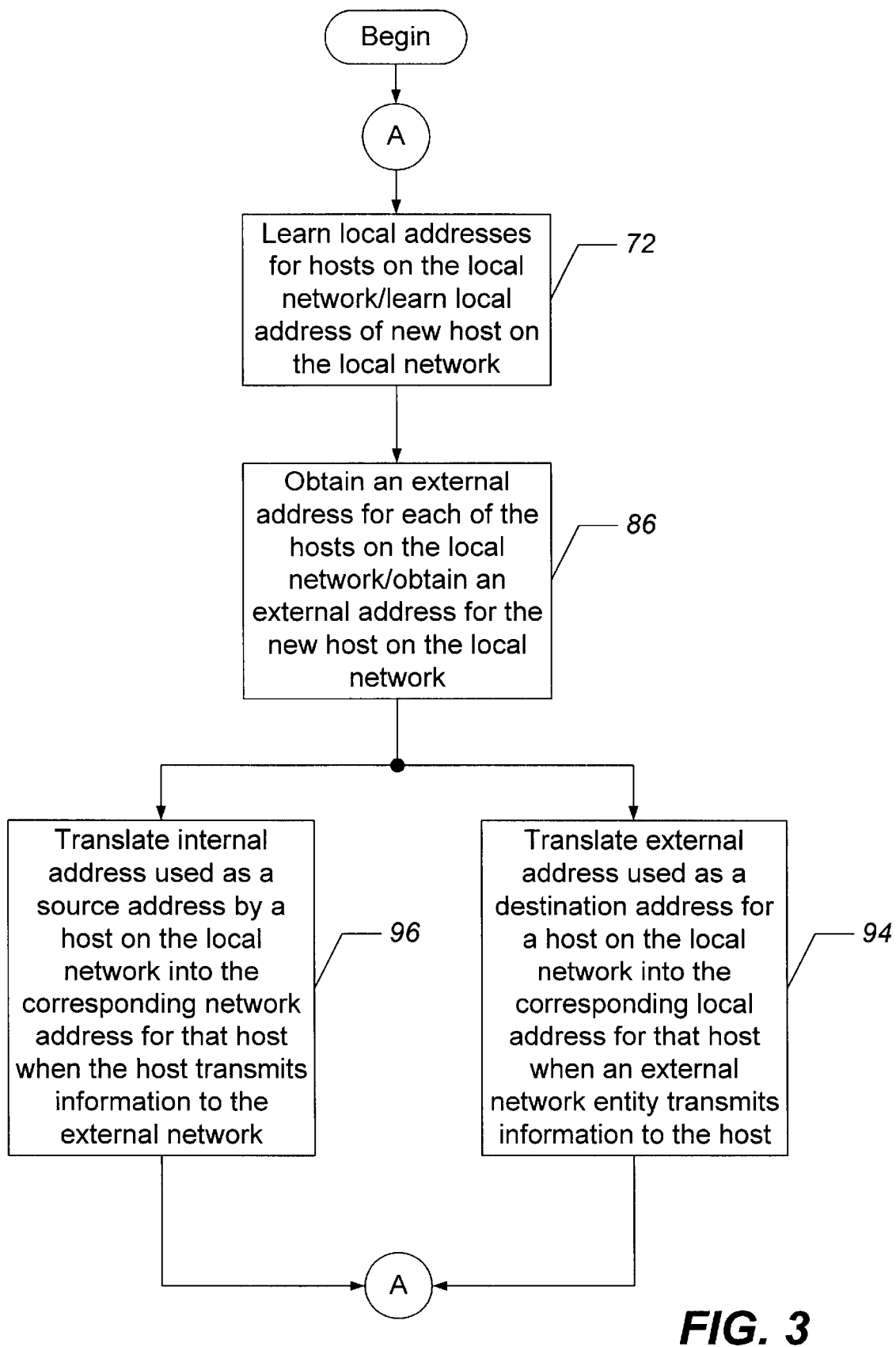
FIG. 3 is a flow chart that illustrates exemplary operations of embodiments of network interface devices, methods, systems, and computer program products for connecting networks using different address domains in accordance with the present invention.

With reference to the flowchart of FIG. 3, exemplary operations of the cable network interface device 26a, in accordance with an embodiment of the present invention, will be described hereafter. It will be understood that the DSL network interface device 26b may also apply these operations in connecting the local network 22 to the DSL network 37. Moreover, it should be further understood that these operations may generally be applied to connect a local network to an external network, which uses a different address domain than the local network, through a network interface device. In general, the embodiment chosen for the network interface device may be based on the types of networks (i.e., the local and external networks) that the network interface device is being used to connect.

Operations begin at block 72 where the local address learning module 62 learns the local addresses for hosts on the local network 22. In addition, after learning the addresses of the hosts on the local network 22 at initialization, the local address learning module 62 may also learn the addresses of new hosts as they are added to the local network 22. These learned local addresses for the hosts on the local network 22 may be stored in the data module 68 for use by the address translation module 66 as will be described hereinafter. In accordance with various embodiments of the present invention, the local addresses of the hosts on the local network 22 may be learned in alternative ways.

Figure 4A:
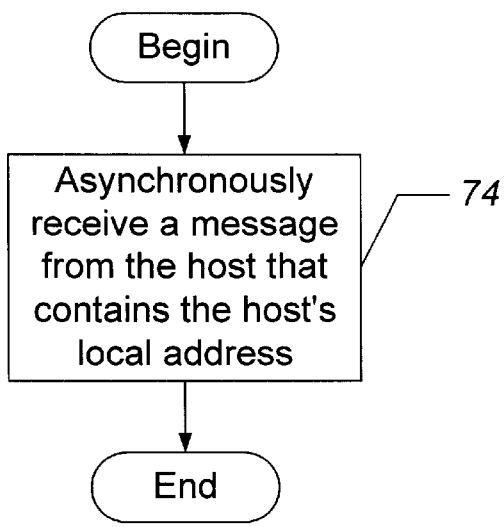
FIGS. 4A–4C are flow charts that illustrate exemplary operations of embodiments of local address learning, which may be used in embodiments of network interface devices, methods, systems, and computer program products of FIG. 3 in accordance with the present invention.

With reference to FIG. 4A, one approach to learning the local addresses of the hosts on the local network 22 is illustrated at block 74 where a message may be asynchronously received from a host that contains that host's local address. According to the FIG. 4A embodiment, the cable network interface device 26a plays a passive role in learning the hosts on the local network 22 and waits for the first transmission from each host to learn that respective host's local address.

Figure 4B:
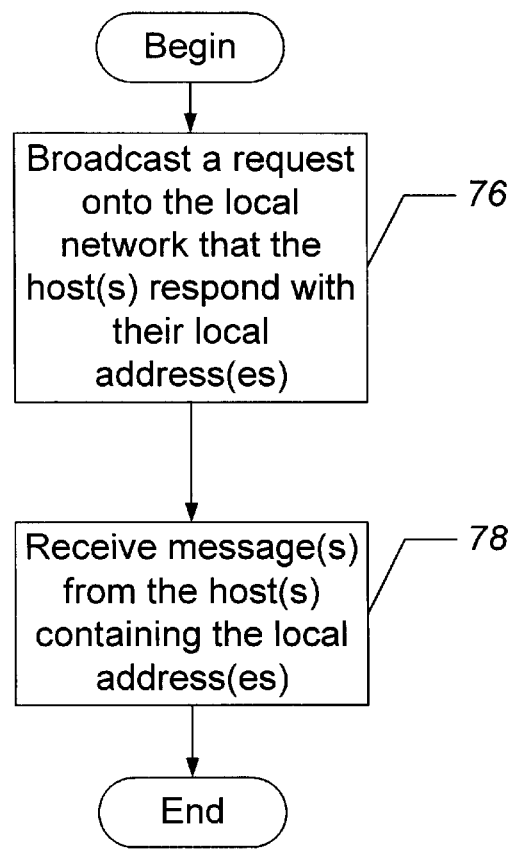

With reference to FIG. 4B, another approach to learning the local addresses begins at block 76 where a request that the hosts respond with their local addresses may be broadcast on the local network 22. A message may then be received at block from each of the responding hosts containing that host's local address.

Figure 4C:
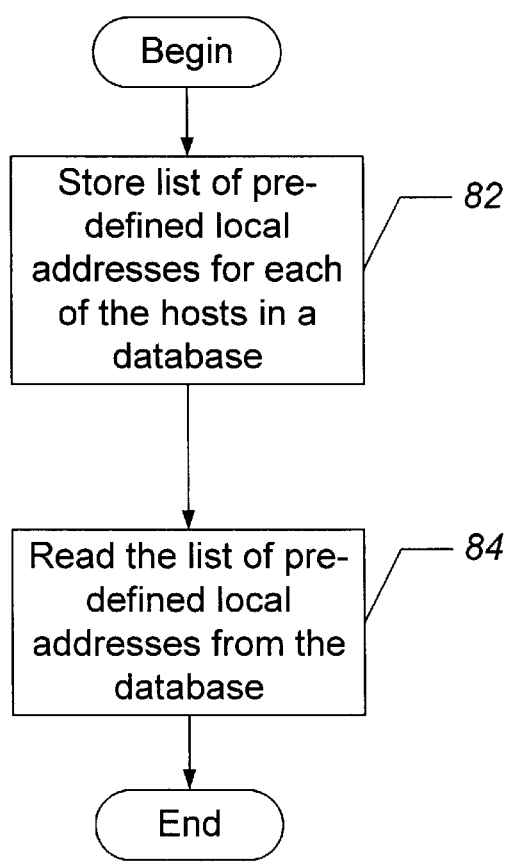

Still another approach to learning the local addresses of the hosts on the local network 22 is illustrated in FIG. 4C. In this embodiment, a list of pre-defined local addresses for the hosts may be stored in a database (e.g., data module 68) on a computer readable storage medium (e.g., memory 54) at block 82. The local addresses may then be read from this stored, pre-defined list at block 84. In accordance with the FIG. 4C embodiment, the administrator of the local network 22 may go to a Web page for the cable network interface device 26a to set up the list of pre-defined local addresses for the hosts that are to be allowed to communicate with the external, CATV network 24.

Figure 5:
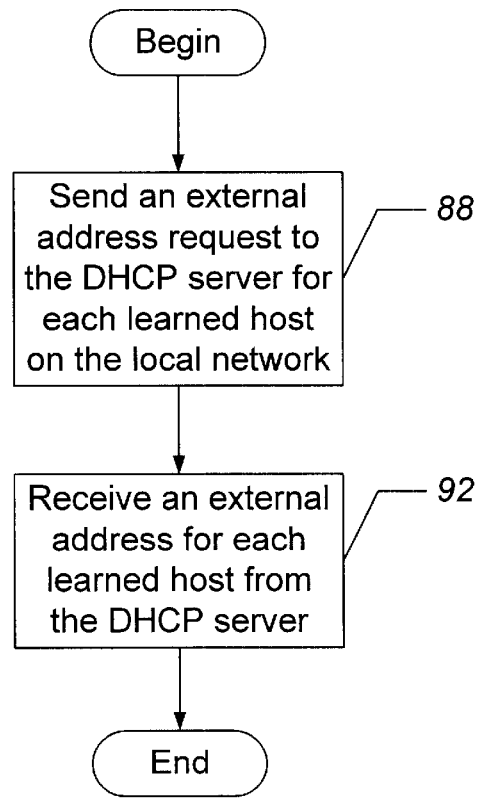
FIG. 5 is a flow chart that illustrates exemplary operations of embodiments of external address acquisition, which may be used in embodiments of network interface devices, methods, systems, and computer program products of FIG. 3 in accordance with the present invention.

Returning to FIG. 3, operations continue at block 86 where the external address acquisition module may obtain external addresses for each of the hosts learned at block 72. More specifically, the cable network interface device 26a may obtain external addresses for the learned hosts that are compatible with the CATV network 24 address domain. These external addresses obtained for the hosts on the local network 22 may be stored in the data module 68 for use by the address translation module 66 as will be described hereinafter. In accordance with an embodiment of the present invention, operations at block 86 may be implemented as illustrated in FIG. 5. For example, at block 88, the external address acquisition module 64 may send an external address request to the DHCP server 32 for each learned host. An external address may then be received from the DHCP server 32 at block 92 in response to each request sent at block 88. Frequently, the external address domain may comprise an IP address space for a particular class, network and/or subnetwork. In this case, the external address requests sent by the external address acquisition module 64 at block 88 preferably contain the media access control (MAC) address of the cable network interface device 26a and an IP address of all zeros, which is the default IP address.

Returning to FIG. 3, once the local addresses of the hosts on the local network 22 have been learned and external addresses have been obtained for each of the learned hosts, information may be sent from the external network (i.e., the CATV network 24) to a host using the external address associated with the host as a destination address. The address translation module 66 may translate the external address used as the destination address for the host into the local address for the host in real-time at block 94. Similarly, information may be sent from a learned host to the external network using the local address associated with that host as the source address. The address translation module 66 may translate the local address used as the source address by the host into the corresponding network address for the host in real-time at block 96. The address translation operations of blocks 94 and 96 continue in perpetuity while the cable network interface device 26a, the CATV network 24, and the local network 22 remain in operation. Moreover, the operations at blocks 72 and 86 may be invoked when a new host is added to the local network 22 or the cable network interface device 26a initializes.

The administrator of the CATV network 24 (e.g., the MSO) may wish to provide Internet service to the hosts on the local network 22. In this regard, in accordance with an embodiment of the present invention, an MSO may use Network Address Translation (NAT) at the Internet server 34 where the external addresses obtained by the external address acquisition module 66 for the learned hosts on the local network 22 are associated with a single NAT address, which is a valid Internet address.

The present invention may, therefore, serve as a proxy by translating local addresses into external addresses and vice versa for communication between hosts on the local network and entities in the external network. Unlike systems that use NAT in which multiple local addresses may be mapped to a single external address, the present invention may provide a unique, one-to-one correspondence between the local addresses and the external addresses associated with the hosts on the local network 22. Advantageously, an administrator or operator, such as a multiple service operator (MSO) in the CATV network 24, may monitor the number of hosts that are in service on the local network 22 through the external addresses that are assigned to the hosts. This may allow the CATV network 24 administrator to bill for their service based on the number of hosts on the local network 22 without the need to periodically send a representative into the field to inspect the local network 22.

In addition, by providing address translation at the interface of the local network 22 with the external network (i.e., the CATV network 24), the local network 22 need not be reconfigured through the elimination of existing local addresses and/or the addition of new external network addresses into the local network. Thus, the present invention may allow the local network 22 to communicate with the CATV network 24 while isolating the local network 22 from the details of the CATV network 24 configuration (i.e., address domain). This aspect of the present invention may facilitate "plug-and-play" access of the CATV network 24 from the point of view of hosts on the local network 22. Accordingly, the need for site visits by technicians associated with the CATV network 24 operator (e.g., the MSO) to establish external network service when a new host is added to the local network 22 or for initially establishing external network service to the local network 22 may be reduced or even eliminated.

The operations discussed hereinabove with reference to FIGS. 3, 4A–4C, and 5, may be implemented in parallel and/or sequentially by multiple network interface devices used to respectively connect a local network to a plurality of external networks. For example, as shown in FIG. 1, the cable network interface device 26a and the DSL network interface device 26b may be used to connect the local network 22 to the CATV network 24 and the DSL network 37, respectively.

The flowcharts of FIGS. 3, 4A–4C, and 5 show the architecture, functionality, and operation of an exemplary implementation of network interface device software. In this regard, each block may represent a module, segment, or portion of code, which comprises one or more executable instructions for implementing the specified logical function (s). It should also be noted that in some alternative implementations, the functions noted in the blocks may occur out of the order noted in FIGS. 3, 4A–4C, and 5. For example, two blocks shown in succession in FIGS. 3, 4A–4C, and 5 may be executed substantially concurrently or the blocks may sometimes be executed in the reverse order, depending upon the functionality involved.

From the foregoing it can readily be seen that the present invention may provide a local network with plug-and-play access of an external network while allowing administrators of the external network to have easier access to information with respect to the configuration of the local network, which may facilitate billing for services based on the number of hosts on the local network.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

I claim:

1. A network interface device for connecting a local network to an external network, comprising:
    a local address learning module that is configured to learn a plurality of local addresses, a respective one of the plurality of local addresses being associated with a respective one of a plurality of hosts on the local network;
    an external address acquisition module that is configured to obtain a plurality of external addresses, a respective one of the plurality of external addresses being associated with the respective one of the plurality of hosts, the plurality of external addresses being associated with the external network; and
    an address translation module that is configured to associate the respective one of the plurality of external addresses with the respective one of the plurality of local addresses for communication between the respective one of the plurality of hosts and the external network.

2. The network interface device as recited in claim 1, wherein the address translation module is further configured to translate the respective one of the plurality of external addresses into the respective one of the plurality of local addresses for information transmitted from the external network to the respective one of the plurality of hosts using the respective one of the plurality of external addresses as a destination address.

3. The network interface device as recited in claim 1, wherein the address translation module is further configured to translate the respective one of the plurality of local addresses into the respective one of the plurality of external addresses for information transmitted from the respective one of the plurality of hosts to the external network using the respective one of the plurality of local addresses as a source address.

4. A method of communication, comprising the steps of:
    learning a plurality of local addresses, a respective one of the plurality of local addresses being associated with a respective one of a plurality of hosts on a local network, the plurality of local addresses being associated with the local network;
    obtaining a plurality of first external network addresses, a respective one of the plurality of first external network addresses being associated with the respective one of the plurality of hosts, the plurality of first external network addresses being associated with a first external network; and
    associating the respective one of the plurality of first external network addresses with the respective one of the plurality of local addresses for communication between the respective one of the plurality of hosts and the first external network.

5. The method of communication as recited in claim 4, wherein the step of associating the respective one of the plurality of first external network addresses with the respective one of the plurality of local addresses comprises the steps of:
    sending information from the first external network to the respective one of the plurality of hosts using the respective one of the plurality of first external network addresses as a destination address; and
    translating the respective one of the plurality of first external network addresses into the respective one of the plurality of local addresses responsive to the step of sending information from the first external network to the respective one of the plurality of hosts using the respective one of the plurality of first external network addresses as the destination address.

6. The method of communication as recited in claim 4, wherein the step of associating the respective one of the plurality of first external network addresses with the respective one of the plurality of local addresses comprises the steps of:

sending information from the respective one of the plurality of hosts to the first external network using the respective one of the plurality of local addresses as a source address; and translating the respective one of the plurality of local addresses into the respective one of the plurality of first external network addresses responsive to the step of sending information from the respective one of the plurality of hosts to the first external network using the respective one of the plurality of local addresses as the source address.

7. The method of communication as recited in claim 4, wherein the step of learning the plurality of local addresses comprises the step of:

asynchronously receiving a message from the respective one of the plurality of hosts that contains the respective one of the plurality of local addresses associated with the respective one of the plurality of hosts.

8. The method of communication as recited in claim 4, wherein the step of learning the plurality of local addresses comprises the steps of:

broadcasting a request onto the local network that the plurality of hosts respond with their respective local addresses; and receiving a message from the respective one of the plurality of hosts that contains the respective one of the plurality of local addresses associated with the respective one of the plurality of hosts.

9. The method of communication as recited in claim 4, wherein the step of learning the plurality of local addresses comprises the steps of:

storing a list of pre-defined local addresses, a respective one of the pre-defined local addresses being associated with the respective one of the plurality of hosts; and reading the list of pre-defined local addresses.

10. The method of communication as recited in claim 4, wherein the step of obtaining the plurality of first external network addresses comprises the steps of:

sending a plurality of first external network address requests to a dynamic host configuration protocol (DHCP) server; and receiving the plurality of first external network addresses respectively associated with the plurality of hosts from the DHCP server.

11. The method of communication as recited in claim 10, wherein the local network and the first external network are connected by a network interface device, the plurality of first external network addresses comprises a plurality of Internet Protocol (IP) addresses, and the step of sending the plurality of first external network address requests to the DHCP server comprises the step of:

sending a plurality of first external network address requests that each contain a media access control (MAC) address of the network interface device and an IP address of all zeros to the DHCP server.

12. The method of communication as recited in claim 4, wherein the plurality of first external network addresses comprises a plurality of Internet Protocol (IP) addresses.

13. The method of communication as recited in claim 4, further comprising the step of:

associating the plurality of first external network addresses with a network address translation (NAT) address, the NAT address being associated with a second external network.

14. The method of communication as recited in claim 4, further comprising the steps of:

obtaining a plurality of second external network addresses, a respective one of the plurality of second external network addresses being associated with the respective one of the plurality of hosts, the plurality of second external network addresses being associated with a second external network; and associating the respective one of the plurality of second external network addresses with the respective one of the plurality of local addresses for communication between the respective one of the plurality of hosts and the second external network.

15. A communication system, comprising:

a local network having a plurality of hosts thereon, a respective one of the plurality of hosts being associated with a respective one of a plurality of local addresses;

a first external network;

a first network interface device, comprising:

a local address learning module that is configured to learn the plurality of local addresses;

an external address acquisition module that is configured to obtain a plurality of first external network addresses, a respective one of the plurality of first external network addresses being associated with the respective one of the plurality of hosts, the plurality of first external network addresses being associated with the first external network; and an address translation module that is configured to associate the respective one of the plurality of first external network addresses with the respective one of the plurality of local addresses for communication between the respective one of the plurality of hosts and the first external network.

16. The communication system as recited in claim 15, wherein the address translation module is further configured to translate the respective one of the plurality of first external network addresses into the respective one of the plurality of local addresses for information transmitted from the first external network to the respective one of the plurality of hosts using the respective one of the plurality of first external network addresses as a destination address.

17. The communication system as recited in claim 15, wherein the address translation module is further configured to translate the respective one of the plurality of local addresses into the respective one of the plurality of first external network addresses for information transmitted from the respective one of the plurality of hosts to the first external network using the respective one of the plurality of local addresses as a source address.

18. The communication system as recited in claim 15, further comprising:

a second external network; and a server that connects the first external network to the second external network, the server being configured to associate the plurality of first external network addresses with a network address translation (NAT) address, the NAT address being associated with the second external network.

19. The communication system as recited in claim 15, further comprising:

a second external network; and a second network interface device, comprising:

a local address learning module that is configured to learn the plurality of local addresses;

an external address acquisition module that is configured to obtain a plurality of second external network addresses, a respective one of the plurality of second external network addresses being associated with the respective one of the plurality of hosts, the plurality of second external network addresses being associated with the second external network; and an address translation module that is configured to associate the respective one of the plurality of second external network addresses with the respective one of the plurality of local addresses for communication between the respective one of the plurality of hosts and the second external network.

20. A computer program product for facilitating communication, comprising:

a computer readable storage medium having computer readable program code embodied therein, the computer readable program code comprising:

computer readable program code for learning a plurality of local addresses, a respective one of the plurality of local addresses being associated with a respective one of a plurality of hosts on a local network, the plurality of local addresses being associated with the local network;

computer readable program code for obtaining a plurality of first external network addresses, a respective one of the plurality of first external network addresses being associated with the respective one of the plurality of hosts, the plurality of first external network addresses being associated with a first external network; and computer readable program code for associating the respective one of the plurality of first external network addresses with the respective one of the plurality of local addresses for communication between the respective one of the plurality of hosts and the first external network.

21. The computer program product as recited in claim 20, wherein the computer readable program code for associating the respective one of the plurality of first external network addresses with the respective one of the plurality of local addresses comprises:

computer readable program code for sending information from the first external network to the respective one of the plurality of hosts using the respective one of the plurality of first external network addresses as a destination address; and computer readable program code for translating the respective one of the plurality of first external network addresses into the respective one of the plurality of local addresses responsive to the computer readable program code for sending information from the first external network to the respective one of the plurality of hosts using the respective one of the plurality of first external network addresses as the destination address.

22. The computer program product as recited in claim 20, wherein the computer readable program code for associating the respective one of the plurality of first external network addresses with the respective one of the plurality of local addresses comprises:

computer readable program code for sending information from the respective one of the plurality of hosts to the first external network using the respective one of the plurality of local addresses as a source address; and computer readable program code for translating the respective one of the plurality of local addresses into the respective one of the plurality of first external network addresses responsive to the computer readable program code for sending information from the respective one of the plurality of hosts to the first external network using the respective one of the plurality of local addresses as the source address.

23. The computer program product as recited in claim 20, wherein the computer readable program code for learning the plurality of local addresses comprises:

computer readable program code for asynchronously receiving a message from the respective one of the plurality of hosts that contains the respective one of the plurality of local addresses associated with the respective one of the plurality of hosts.

24. The computer program product as recited in claim 20, wherein the computer readable program code for learning the plurality of local addresses comprises:

computer readable program code for broadcasting a request onto the local network that the plurality of hosts respond with their respective local addresses; and computer readable program code for receiving a message from the respective one of the plurality of hosts that contains the respective one of the plurality of local addresses associated with the respective one of the plurality of hosts.

25. The computer program product as recited in claim 20, wherein the computer readable program code for learning the plurality of local addresses comprises:

computer readable program code for storing a list of pre-defined local addresses, a respective one of the pre-defined local addresses being associated with the respective one of the plurality of hosts; and computer readable program code for reading the list of pre-defined local addresses.

26. The computer program product as recited in claim 20, wherein the computer readable program code for obtaining the plurality of first external network addresses comprises:

computer readable program code for sending a plurality of first external network address requests to a dynamic host configuration protocol (DHCP) server; and computer readable program code for receiving the plurality of first external network addresses respectively associated with the plurality of hosts from the DHCP server.

27. The computer program product as recited in claim 26, wherein the local network and the first external network are connected by a network interface device, the plurality of first external network addresses comprises a plurality of Internet Protocol (IP) addresses, and the computer readable program code for sending the plurality of first external network address requests to the DHCP server comprises:

computer readable program code for sending a plurality of first external network address requests that each contain a media access control (MAC) address of the network interface device and an IP address of all zeros to the DHCP server.

28. The computer program product as recited in claim 20, wherein the plurality of first external network addresses comprises a plurality of Internet Protocol (IP) addresses.

29. The computer program product as recited in claim 20, further comprising:

computer readable program code for associating the plurality of first external network addresses with a network address translation (NAT) address, the NAT address being associated with a second external network.

30. A communication system, comprising:

means for learning a plurality of local addresses, a respective one of the plurality of local addresses being associated with a respective one of a plurality of hosts on a local network, the plurality of local addresses being associated with the local network;

means for obtaining a plurality of first external network addresses, a respective one of the plurality of first external network addresses being associated with the respective one of the plurality of hosts, the plurality of first external network addresses being associated with a first external network; and means for associating the respective one of the plurality of first external network addresses with the respective one of the plurality of local addresses for communication between the respective one of the plurality of hosts and the first external network.

31. The communication system as recited in claim 30, wherein the means for associating the respective one of the plurality of first external network addresses with the respective one of the plurality of local addresses comprises:

means for sending information from the first external network to the respective one of the plurality of hosts using the respective one of the plurality of first external network addresses as a destination address; and means for translating the respective one of the plurality of first external network addresses into the respective one of the plurality of local addresses responsive to the means for sending information from the first external network to the respective one of the plurality of hosts using the respective one of the plurality of first external network addresses as the destination address.

32. The communication system as recited in claim 30, wherein the means for associating the respective one of the plurality of first external network addresses with the respective one of the plurality of local addresses comprises:

means for sending information from the respective one of the plurality of hosts to the first external network using the respective one of the plurality of local addresses as a source address; and means for translating the respective one of the plurality of local addresses into the respective one of the plurality of first external network addresses responsive to the means for sending information from the respective one of the plurality of hosts to the first external network using the respective one of the plurality of local addresses as the source address.

33. The communication system as recited in claim 30, wherein the means for learning the plurality of local addresses comprises:

means for asynchronously receiving a message from the respective one of the plurality of hosts that contains the respective one of the plurality of local addresses associated with the respective one of the plurality of hosts.

34. The communication system as recited in claim 30, wherein the means for learning the plurality of local addresses comprises:

means for broadcasting a request onto the local network that the plurality of hosts respond with their respective local addresses; and means for receiving a message from the respective one of the plurality of hosts that contains the respective one of the plurality of local addresses associated with the respective one of the plurality of hosts.

35. The communication system as recited in claim 30, wherein the means for learning the plurality of local addresses comprises:

means for storing a list of pre-defined local addresses, a respective one of the pre-defined local addresses being associated with the respective one of the plurality of hosts; and means for reading the list of pre-defined local addresses.

36. The communication system as recited in claim 30, wherein the means for obtaining the plurality of first external network addresses comprises:

means for sending a plurality of first external network address requests to a dynamic host configuration protocol (DHCP) server; and means for receiving the plurality of first external network addresses respectively associated with the plurality of hosts from the DHCP server.

37. The communication system as recited in claim 36, wherein the local network and the first external network are connected by a network interface device, the plurality of first external network addresses comprises a plurality of Internet Protocol (IP) addresses, and the means for sending the plurality of first external network address requests to the DHCP server comprises:

means for sending a plurality of first external network address requests that each contain a media access control (MAC) address of the network interface device and an IP address of all zeros to the DHCP server.

38. The communication system as recited in claim 30, wherein the plurality of first external network addresses comprises a plurality of Internet Protocol (IP) addresses.

39. The communication system as recited in claim 30, further comprising:

means for associating the plurality of first external network addresses with a network address translation (NAT) address, the NAT address being associated with a second external network.

40. The communication system as recited in claim 30, further comprising:

means for obtaining a plurality of second external network addresses, a respective one of the plurality of second external network addresses being associated with the respective one of the plurality of hosts, the plurality of second external network addresses being associated with a second external network; and means for associating the respective one of the plurality of second external network addresses with the respective one of the plurality of local addresses for communication between the respective one of the plurality of hosts and the second external network.

* * * * *